United States Patent [19]

Bouette

[11] 4,384,678
[45] May 24, 1983

[54] VALVING ARRANGEMENT

[75] Inventor: David W. Bouette, Macclesfield, England

[73] Assignee: Mono Oakes Limited, Cheshire, England

[21] Appl. No.: 236,599

[22] Filed: Feb. 20, 1981

[30] Foreign Application Priority Data

Feb. 25, 1980 [GB] United Kingdom ............... 8006248

[51] Int. Cl.³ ............................................. B05B 1/32
[52] U.S. Cl. .................................... 239/455; 251/121
[58] Field of Search ............. 239/455, 537, 541, 586, 239/583, 569; 251/121, 122, 155

[56] References Cited

U.S. PATENT DOCUMENTS

| | | | |
|---|---|---|---|
| 497,903 | 5/1893 | Woodward | 239/455 |
| 3,436,023 | 4/1969 | Thalman | 239/537 |
| 4,272,558 | 6/1981 | Bouette . | |

Primary Examiner—John J. Love
Assistant Examiner—Gene A. Church
Attorney, Agent, or Firm—Fleit & Jacobson

[57] ABSTRACT

A valving arrangement for use in the production of an aerated product such as chocolate, in which the product is pressurized with a gas, preferably a soluble gas such as carbon dioxide, wherein the valving arrangement includes a first valve plate (22) having a tapered orifice (22A) therein, a second valve plate (25) which is adjustable relative to the first plate in a plane transverse to the axis of the tapered orifice, and having a corresponding tapered orifice (25A) therein, the axis of which is parallel to the first axis, whereby the flow passage through these orifices can be preadjusted. Means are provided to close off the flow passage through the orifices abruptly without altering the preadjustment of the flow passage. This can be achieved by inserting a rod (16, 30) into the upstream orifice or by moving the valve plate a greater distance than the diameters of the orifices.

10 Claims, 11 Drawing Figures

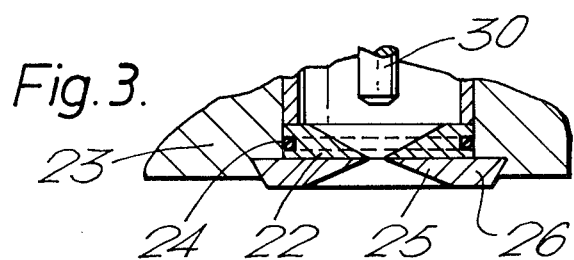
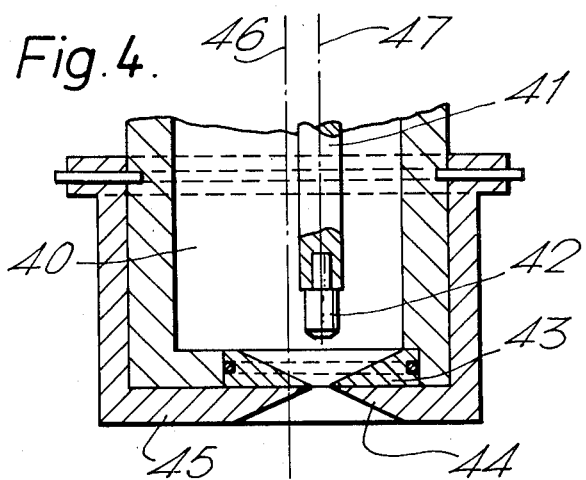

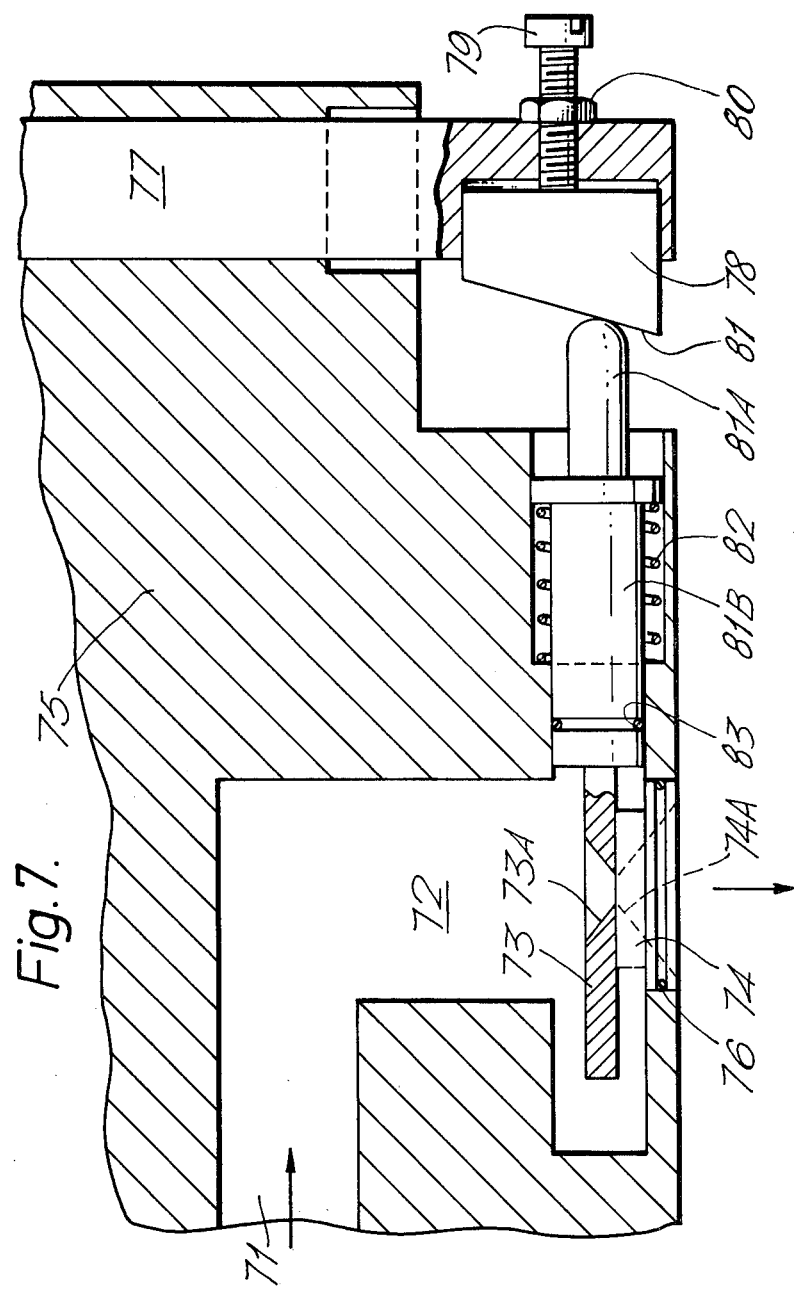

VALVING ARRANGEMENT

The present invention relates to a valving arrangement for use in the production of an aerated product.

It has been proposed in our Application published under number A.2006597 to manufacture an aerated food product, such as chocolate, in which the chocolate is mixed with a soluble gas, such as carbon dioxide, under very high pressure, and the pressure is released suddenly, so that the carbon dioxide comes out of solution and forms bubbles in the chocolate product. This is achieved by passing the pressurized chocolate, together with the carbon dioxide mixed therein, through a sharp-edged valve, the product then passing to atmospheric pressure.

One of the important features of this method is that the rate of pressure drop as the product leaves the system shall be as high as possible, and the valve shown achieves this, while giving a good adjustment of flow area, and thus pressure drop, when the product is flowing continuously.

However, from time to time, one wishes to cut off the flow of product, or, indeed, to provide short lengths, for example to produce separate pieces of chocolate or bars of chocolate. The method hitherto used involved a separate by-pass valve which was located upstream of the sharp-edged orifice valve. The problem with this arrangement is that a quantity of the chocolate product will be left within the sharp-edged valve and this may solidify and cause a blockage.

It is now proposed, according to the present invention, to provide a valving arrangement for use in the production of an aerated product, said valving arrangement comprising a chamber having an inlet and an outlet, a first valve plate covering said outlet, a first tapered orifice in said first plate in register with said outlet and converging in a direction away from the chamber, a second valve plate overlying said first valve plate in face-to-face relation on the face of said first plate remote from said chamber, a second tapered orifice in said second valve plate having its axis parallel to that of the first tapered orifice and converging towards said chamber, to define with said first tapered orifice a sharp-edged outlet flow passage from said chamber, a preadjustable control for adjusting the relative positions of said first and second plates in a plane transverse to the axis of said orifices, whereby the cross-section of the outlet flow passage may be preadjusted and means for closing off abruptly the flow passage through said orifices without altering the preadjustment of said control and thus of said flow passage.

With such an arrangement, it is possible to achieve a fully open or accurately pre-adjusted partially open position of the valve and a closed position in a timed sequence, to obtain regular volumes or weights of product discharged, whilst ensuring that the volume of material which may be trapped at the moment of closure upstream of the plane of the two orifices is small or negligible. This means that when the valve is open, opening or shut, the volume of material which is momentarily not subject to the normal high rate of pressure drop is minimized and it is possible to ensure that this volume is less than 0.01 cubic centimeters, which is very small compared with the minimum deposit volume likely to be required with this process which will normally be in excess and indeed greatly in excess of 1 cubic centimeter.

In order to make, for example, bars of chocolate, it is advantageous to have an intermittent supply of the aerated chocolate. To produce this effect, the means to close off the flow passage through the orifices abruptly may comprise a rod insertable in the orifice of one of the valve plates. Advantageously, the rod is movable along the axis of the orifice of the first valve plate on the upstream side thereof, with respect to the flow of product through the flow passages formed by the orifices.

Preferably, the rod is movable by means comprising a plunger on which the rod is mounted, a fluid pressure operated piston and cylinder arrangement, a lost motion connection between the plunger and the piston and cylinder arrangement and a spring associated with said lost motion connection to urge the slide towards the first valve plate, whereby when the rod engages the first valve plate the spring is compressed.

The second valve plate may be adjustable by means of a threaded member engaging in the valve plate, rotation of the threaded member causing movement of the second valve plate.

Alternatively, the second valve plate may be mounted on an annulus which is rotatable relative to the first valve plate, the axis of the orifice in the second valve plate being offset with respect to the axis of rotation of the annulus, whereby rotation of the annulus causes relative adjustment between the orifices in the valve plates.

This general type of construction may further comprise a hollow, axially movable piston in sliding contact with the exterior surface of the rod, an axially movable sleeve in sliding contact with the exterior surface of the piston, and means to move said piston and sleeve whereby the piston and sleeve may initially be moved to a position allowing material to flow between said first valve plate and said piston and sleeve, whereby the sleeve may then be moved axially into contact with the first valve plate, to trap a quantity of material therewithin, whereby the rod may then be moved away from the orifice and the piston moved towards the orifice in the first valve plate, to discharge a metered quantity of pressurized material through the orifice.

When the intention is to have a generally continuous operation, which needs to be stopped off from time to time, the means for closing off the flow passage through said orifice abruptly may comprise means for moving the second valve plate by a distance completely to close off the orifices. These means may comprise a reciprocable slide upon which the second valve plate is mounted, and, for example, a fluid pressure operated mechanism for moving the slide.

The slide may, in one particular embodiment, include a member in sliding engagement with a ramp, means to move the ramp transverse to the direction of sliding of the slide effective to provide forward movement of the slide and a return spring urging said member against said ramp. Conveniently, the means to move the ramp comprise a fluid pressure operated piston and cylinder arrangement.

The ramp may be adjustable to provide the adjustment of the second valve plate relative to the first valve plate, to give the preadjustment of the flow passage through said orifices.

In order that the present invention may more readily be understood, the following description is given, merely by way of example, reference being made to the accompanying drawings, in which:

FIG. 3 is a section taken along the line III—III of FIG. 1;

FIG. 4 is a section through a further embodiment of valving arrangement according to the invention;

FIG. 7 is a section through a still further embodiment of valving arrangement according to the invention.

Figure 1:
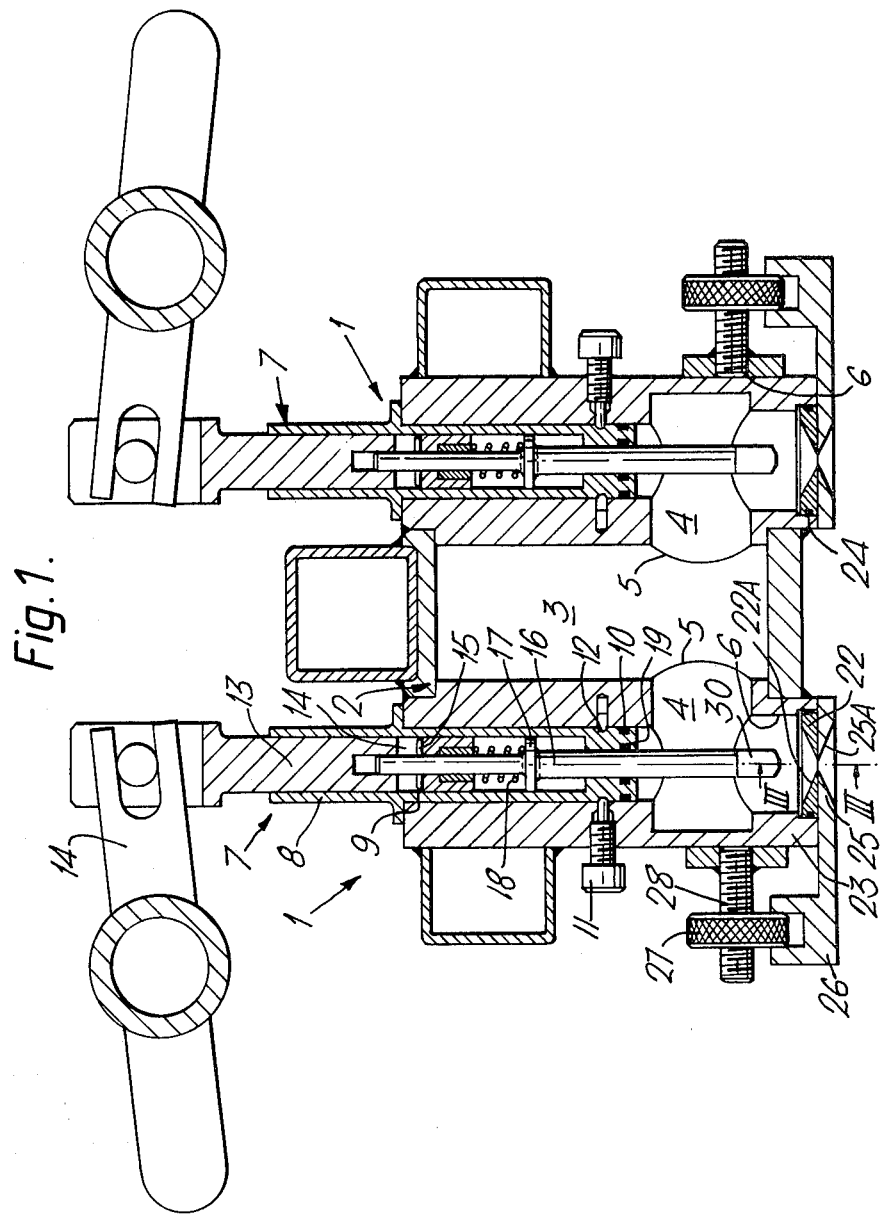
FIG. 1 is a cross-section through one embodiment of valving arrangement according to the invention.

Referring first to FIG. 1, there are illustrated two identical valving arrangements 1 arranged back-to-back on a common manifold 2. This manifold has an internal manifolding chamber 3 which, in the particular embodiment contemplated, feeds fifteen pairs of valve arrangement 1. Each valve arrangement 1 includes a chamber 4 having an inlet 5 from the manifolding chamber.

Arranged at right angles to the inlet 5 of each chamber 4 is an outlet 6 which is closed by a floating valve plate 22, which is located in position in a body portion 23 of the valve by a second valve plate 25, the floating valve plate 22 being provided with a sealing O-ring 24. Thus, fluid pressure in chamber 6 ensures proper mating of the valve plates 22 and 25, so that their surfaces are flat, one on another, to give a good fluid seal. The plate 22 is provided with a conically tapered orifice 22A which converges away from the interior of the chamber 6. The second valve plate 25 is provided with a similar tapered orifice 25A which tapers towards the first valve plate 22, the two plates providing a sharp edged exit flow passage therebetween.

The plate 25 is mounted on a slide 26 engaged by a nut 27 threaded onto a stud 28 carried on the body 23. This arrangement provides for adjustment of the orifice size by rotation of the nut 28, to cause relative adjustment of the two orifices in the valve plate 22 and 25, so that the flow passage through the orifices can be preadjusted.

Associated with each flow passage is a piston insert assembly indicated by the general reference numeral 7. This is in the form of a generally cylindrical housing 8 flanged at 9 to bear against an upper end of the associated housing 23, the cylindrical housing 8 being provided with an O-ring 10 and being held in place in the housing by a threaded locating pin 11 engaging in a detent 12 on the outer surface of the housing.

Axially reciprocable within the housing is a piston 13 which can be axially reciprocated, in common with all the corresponding pistons 13, by a fluid pressure actuated lever 14.

The piston 13 has a slot 14 in which is slidable a transverse pin 15 carried on a plunger 16 which is axially reciprocable within the piston. The plunger 16 has a head 17 at its upper end against which bears a coiled compression spring 18. Thus, the arrangement of the plunger 16 within the piston 13 allows for a lost motion connection between the piston and the plunger allowing the plunger to be urged resiliently slightly relative to the piston. A further O-ring 19 provides a seal between the plunger and the piston.

At its lower end the plunger 16 carries an end piece 30 formed of a plastics material, this having a conically turned end which is shaped to fit the orifice of the valve plate 22A. The end piece 30, and its plunger 16, are thus arranged on the upstream side of the relatively fixed, but slightly floating, valve plate 22.

Figure 2A:
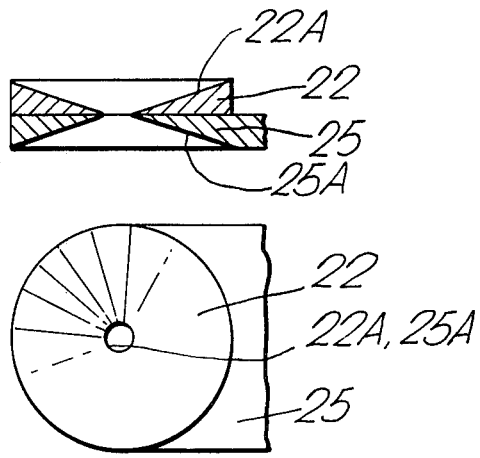
FIGS. 2A and 2B show two different positions of the valve plates of the arrangement of FIG. 1.
Figure 2B:
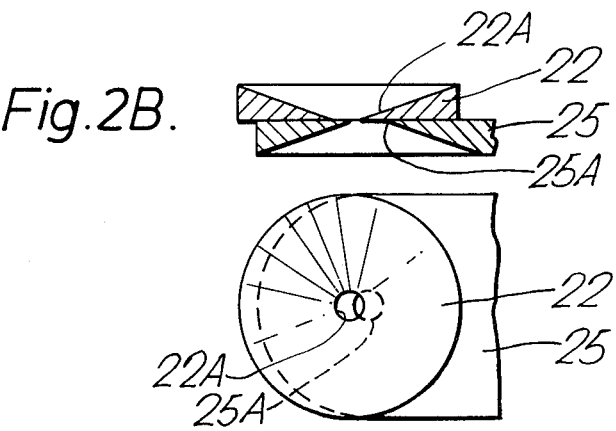

In use of the valving arrangement for example, in the production of aerated chocolate, as described in our Application published under number A2006597, one first of all has to adjust the flow passage through the orifices. This is done by operating the adjustment control in the form of the adjusting nut 27 which moves the slide 25 to the desired position which can be determined by experiment. In this way one can achieve the desired preadjustment of the flow passage through the orifices. FIGS. 2A and 2B show the situation when the orifices are in the most fully open position and in a fairly closed position respectively.

When it is desired to shut off the flow of the chocolate or similar material, a pneumatic device (not shown) is operated and the lever 14 is tilted in a clockwise direction thus forcing the piston 13 downwardly. A spring 18 will cause the plunger 16 to move downwardly until the end piece 30 engages in an orifice 22A. Slight continued further downward movement of the piston 13 is permitted by the lost motion connection provided by the slot 14 and the transverse pin 15. This arrangement ensures that the preloading of the end piece in the orifice 22A remains substantially constant despite any slight misadjustment. It will be appreciated that this will have the effect of closing off the through passage very abruptly and that the preadjustment of the cross-section of the orifice will not in any way be altered. The device is capable of operating at a relatively high speed and the timing can be such as to give a reasonably accurate adjustment of the volume discharged. In one particular instance the valving arrangement is used to charge simultaneously thirty cavities in a chocolate depositing tray, the piston being operated at a rate of 26 times a minute, thus accurately dispensing the desired quantity of chocolate giving the correct pressure drop across the orifices without in any way disturbing the preadjustment which is necessary to give this accurate pressure drop.

Figure 5A:
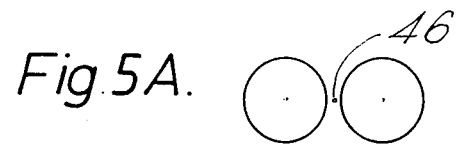
FIGS. 5A, 5B and 5C show three different positions of the valve plate of the arrangement of FIG. 4.
Figure 5B:
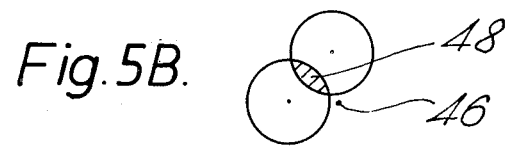
Figure 5C:

FIGS. 4 and 5 show a generally similar arrangement, but here the fixed or floating valve plate 43 is mounted with its orifice on one axis, and the lower valve plate 44 is mounted on an annular member 45 which is rotatable about an axis 46 which is offset from the axis 47 through the orifices and valve plates 43 and 44. Thus, rotation of the annulus 45 will cause rotational displacement of the orifices of the plates 43 and 44 relative to one another as can be seen in FIGS. 5A, 5B and 5C. The shaded area 48 and 49 in FIGS. 6B and 6C show partial and complete overlap of the two orifices. A rod 41 with a cap 42 is again provided as in FIGS. 1, 2 and 3.

Figure 6:
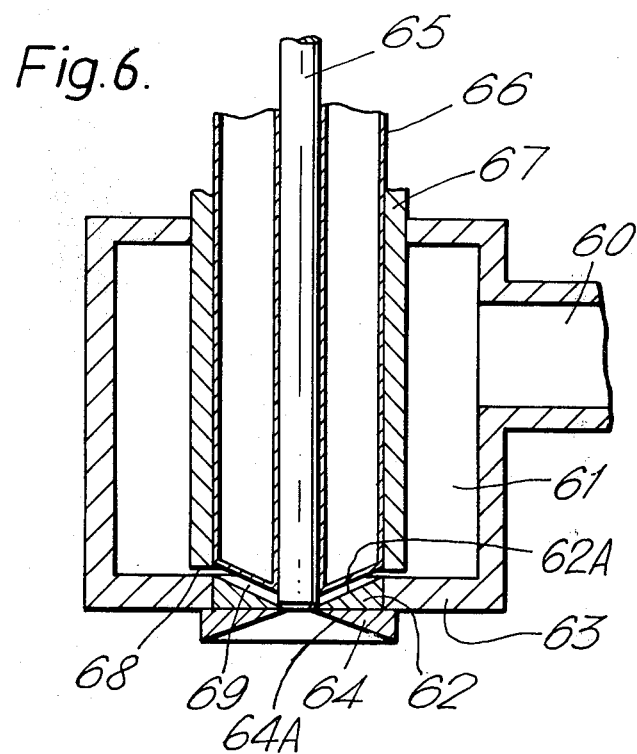
FIG. 6 is a diagrammatic section through a further embodiment of valving arrangement according to the invention.

FIG. 6 shows a further modification. The construction of the means for moving the orifices relative to one another can be either as shown in FIGS. 1 to 3 or as in FIGS. 4 and 5.

In this arrangement, the product inlet 60 extends into the chamber 61 having a lower end wall 63 in which is located a fixed or floating valve plate 62. The other valve plate 64, as indicated above, be moved by any suitable means to effect the preadjustment of the flow passage through the orifices 62A,64A of the valve plates. In this construction, within the chamber 61, is provided a rod 65, similar to the plunger illustrated in FIGS. 1 to 3, which is axially aligned with the orifices through the valve plates, the lower end of the rod 65 being shaped to conform to the shape of the taper of the orifice in the upper valve plate 62.

A hollow piston 66 is axially slidable so that its internal surface is in sliding contact with the external surface of the rod 65. Similarly, a sleeve 67 is axially slidable with its inner surface in contact with the outer surface of the piston 66.

In use, the piston 66 and the sleeve 67 are raised, when the rod 65 has closed the orifices in the valve plates, so that a gap 68, 69 is provided below the sleeve and the piston. The sleeve 67 is then lowered, so that it contacts the plate or end wall 63, thus entrapping product, under pressure, below the piston and around the rod 65. The rod 65 is then raised and the piston 66 lowered together, so that the product is forced out, still under pressure, through the orifices. The volume which is discharged for each movement can be determined by suitable previous displacement upwardly of the piston 66. Thus, an accurately metered quantity of product can be discharged at each operation. When the metered quantity has been discharged, the rod 65 is once again forced into the orifice abruptly to cut off the flow without disturbing the preadjustment of cross-section of the flow passage and also allowing constant pressure operation.

This arrangement will only be necessary in certain rather specialist circumstances where the product being discharged needs to be extremely accurately controlled, because the control sequence which can be achieved with the construction of FIGS. 1 to 3 is normally adequate.

A further arrangement is shown in FIG. 7, from which it will be seen that product inlet 71 leads into a chamber 72 within which is secured, in fixed position, a first valve plate 74, mounted in the holder provided with a peripheral O-ring seal 76. A second valve plate 73 is slidable with respect to, and in contact with, the first valve plate 74, on the upstream side thereof, that is near the interior of the chamber 72. The two valve plates 73 and 74 are provided with truncated conical tapered orifices 73A and 74A respectively.

Figure 8:
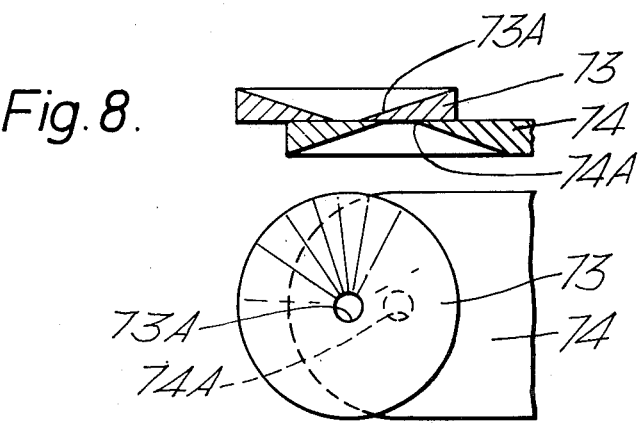
FIG. 8 is a view similar to FIG. 2 showing a third portion of the plates of the arrangement of FIG. 7.

The body 75 of the valving arrangement has slidable in the vertical direction, as viewed in the drawing, a member 77, the vertical reciprocation of which is effected by a fluid pressure operated piston and cylinder arrangement (not shown). The member 77 carries a cam 78, the horizontal position of which can be adjusted by a screw 79 and a nut 80. The cam 78 has a ramp surface 81, between cooperating with a follower 81A, which itself carries a slide 81B upon which is mounted the second valve plate 73. The return spring 82 is provided to urge the follower 81A against the ramp 81. In order to prevent product from escaping from chamber 72, an O-ring seal 83 is provided around the slide 81B. The first two positions of the valve which can be achieved by adjustment, are similar to those illustrated in FIGS. 2A and 2B. FIG. 8 shows an arrangement in which two orifices 73A and 74A do not communicate with one another at all. The arrangement of FIGS. 2A and 2B can be achieved by adjusting the screw 79 to move the ramp surface 81 of the cam 78 to the left by a greater or smaller amount. Thus, one can achieve a preadjustment of the flow passage through the orifices. When it is desired to cut off the flow, the fluid cylinder connected to member 77 is operated, and the cam is moved a suitable amount to move the valve plate by a larger amount to achieve the arrangement shown in FIG. 8, so that no flow can take place. This arrangement, thus, ensures an abrupt cut off of the flow. When the fluid piston and cylinder are returned to their previous position, then valve plates will re-assume their previous preadjustment.

I claim:
1. A valving arrangement for use in the production of an aerated product, said valving arrangement comprising:
   (a) a chamber;
   (b) an inlet to said chamber;
   (c) an outlet from said chamber;
   (d) a first valve plate covering said outlet;
   (e) a first tapered orifice in said first plate in register with said outlet and converging in a direction away from the chamber;
   (f) a second valve plate overlying said first valve plate in face-to-face relation on the face of said first plate remote from said chamber;
   (g) a second tapered orifice in said second valve plate having its axis parallel to that of the first tapered orifice and converging towards said chamber, effective to define with said first tapered orifice a sharp edged outlet flow passage from said chamber;
   (h) a pre-adjustable control for adjusting the relative positions of said first and second plates in a plane transverse to the axis of said orifices, whereby the cross-section of the outlet flow passage may be preadjusted; and
   (i) means for closing off abruptly the flow passage through said orifices without altering the preadjustment of said control and thus of said flow passage.

2. A valving arrangement as claimed in claim 1, wherein the means for closing off abruptly the flow passage through said orifices comprises a rod insertable in the orifice of one of said valve plates.

3. A valving arrangement as claimed in claim 2, wherein said rod is movable along the axis of the orifice of said first valve plate on the upstream side thereof with respect to the flow of product through the flow passage formed by said orifices.

4. A valving arrangement as claimed in claim 3, and further comprising means to move said rod along the axis of the orifices of said first valve plate, said means comprising a plunger on which the rod is mounted, a fluid pressure operated piston and cylinder arrangement, a lost motion connection between the plunger and the piston and cylinder arrangement and a spring associated with said lost motion connection effective to urge the slide towards the first valve plate, whereby when the rod engages the first valve plate the spring is compressed.

5. A valving arrangement as claimed in claim 3, wherein said preadjustable control comprising
   a threaded member engaging in said second valve plate, rotation of said threaded member causing movement of said second valve plate.

6. A valving arrangement as claimed in claim 3, and further comprising an annulus which is rotatable relative to the first valve plate, and wherein said second valve plate is mounted on said annulus, the axis of the orifice of the second valve plate being offset with respect to the axis of rotation of the annulus, whereby rotation of the annulus causes relative adjustment between the orifices in the valve plates.

7. A valving arrangement as claimed in claim 2, wherein the first valve plate is in communication with said chamber and is in direct abutting relationship with said second valve plate, the preadjustable control providing preadjustment of the second valve plate, and wherein said first valve plate is mounted in said chamber to be movable by fluid pressure in said chamber into engagement with said second valve plate.

8. A valving arrangement as claimed in claim 3 and further comprising a hollow, axially movable piston in sliding contact with the exterior surface of the rod, an axially movable sleeve in sliding contact with the exterior surface of the piston, and means to move said piston and sleeve whereby the piston and sleeve may initially be moved to a position allowing material to flow between said first valve plate and said piston and sleeve, whereby the sleeve may then be moved axially into contact with the first valve plate, to trap a quantity of material therewithin, whereby the rod may then be moved away from the orifice and the piston moved towards the orifice in the first valve plate, to discharge a metered quantity of pressurized material through the orifice.

9. A valving arrangement as claimed in claim 1, wherein said means for closing off abruptly the flow passage through said orifices comprises means for moving said second valve plate by a distance completely to close off the orifices.

10. A valving arrangement as claimed in claim 9 wherein the means to move said second valve plate comprise a reciprocable slide upon which said second valve plate is mounted and a fluid pressure operated mechanism for moving said slide.

* * * * *